United States Patent
Duprez (10) Patent No.: US 11,022,547 B2
(45) Date of Patent: Jun. 1, 2021

(54) OPTICAL GAS SENSOR

(71) Applicant: ELICHENS, Grenoble (FR)

(72) Inventor: Hélène Duprez, Seyssinet-Pariset (FR)

(73) Assignee: ELICHENS, Grenoble (FR)

( * ) Notice: Subject to any disclaimer, the term of this patent is extended or adjusted under 35 U.S.C. 154(b) by 83 days.

(21) Appl. No.: 16/492,802

(22) PCT Filed: Mar. 7, 2018

(86) PCT No.: PCT/FR2018/050524
§ 371 (c)(1),
(2) Date: Sep. 10, 2019

(87) PCT Pub. No.: WO2018/162848
PCT Pub. Date: Sep. 13, 2018

(65) Prior Publication Data
US 2021/0055212 A1 Feb. 25, 2021

(30) Foreign Application Priority Data

Mar. 10, 2017 (FR) ...................................... 1751976

(51) Int. Cl.
*G01N 21/3504* (2014.01)
*G01N 21/31* (2006.01)
(Continued)

(52) U.S. Cl.
CPC ........ *G01N 21/3504* (2013.01); *G01J 3/0202* (2013.01); *G01J 3/0291* (2013.01);
(Continued)

(58) Field of Classification Search
CPC ........ G01J 3/0291; G01J 3/427; G01J 3/0202; G01N 21/3504; G01N 21/314; G01N 2021/317
See application file for complete search history.

(56) References Cited

U.S. PATENT DOCUMENTS

| | | | |
|---|---|---|---|
| 6,469,303 B1 | 10/2002 | Sun et al. | |
| 2013/0221224 A1* | 8/2013 | Maksyutenko | ........ G01N 21/61 250/343 |

FOREIGN PATENT DOCUMENTS

| | | |
|---|---|---|
| EP | 2133684 A1 | 12/2009 |
| WO | 2006/135212 A1 | 12/2006 |
| WO | 2012/126471 A2 | 9/2012 |

OTHER PUBLICATIONS

International Search Report and International Written Opinion for International Application PCT/FR2018/050524, dated Jun. 11, 2018, 9 pages (including English translation of the Written Opinion).

* cited by examiner

*Primary Examiner* — Michael C Bryant
(74) *Attorney, Agent, or Firm* — TraskBritt (57) ABSTRACT

A gas sensor comprises a chamber configured to receive a gas; a light source configured to emit a light wave propagating through the chamber in an emission cone; a measurement photodetector and a reference photodetector, each configured to detect a light wave emitted by the light source and having passed through the chamber. The chamber extends between two transverse walls, arranged opposite one another and connected to one another by a peripheral wall extending therebetween, about a longitudinal axis (Z), and comprising a first reflective segment configured to receive a first portion of the emission cone to reflect it toward the measurement photodetector, thus forming a measurement cone converging toward the measurement photodetector. A second reflective segment of the peripheral wall is configured to receive a second portion of the emission cone to reflect it toward the reference photodetector, thus forming a reference cone converging toward the reference photodetector.

16 Claims, 5 Drawing Sheets

(51) Int. Cl.
*G01J 3/02* (2006.01)
*G01J 3/427* (2006.01)
(52) U.S. Cl.
CPC ............ *G01J 3/427* (2013.01); *G01N 21/314* (2013.01); *G01N 2021/317* (2013.01)

OPTICAL GAS SENSOR

CROSS-REFERENCE TO RELATED APPLICATIONS

This application is a national phase entry under 35 U.S.C. § 371 of International Patent Application PCT/FR2018/050524, filed Mar. 7, 2018, designating the United States of America and published in French as International Patent Publication WO 2018/162848 A1 on Sep. 13, 2018, which claims the benefit under Article 8 of the Patent Cooperation Treaty to French Patent Application Serial No. 1751976, filed Mar. 10, 2017.

TECHNICAL FIELD

The technical field of the disclosure is an optical gas sensor, and more particularly a nondispersive infrared sensor.

BACKGROUND

Recourse is quite frequently made to optical methods for analyzing a gas. Devices allow the composition of a gas to be determined based on the fact that the species from which a gas is composed have absorption spectral properties that are different from one another. Thus, knowing a spectral absorption band of a gaseous species, its concentration may be determined via an estimation of the absorption of the light passing through the gas, using the Beer-Lambert law. This principle allows the concentration of a gaseous species present in the medium to be estimated.

The light source is usually a source that emits in the infrared, the method used usually being referred to as NDIR detection, the acronym NDIR meaning non-dispersive infrared. Such a principle has frequently been employed, and is, for example, described in many documents, for example, in U.S. Pat. No. 5,026,992, or in WO2007064370 or even in U.S. Pat. No. 6,469,303.

In the commonest methods, the analyzed gas lies between a light source and a photodetector, called the measurement photodetector, the latter being intended to measure a light wave transmitted by the gas to be analyzed, and partially absorbed by the latter. These methods generally comprise a measurement of a light wave, called the reference light wave, emitted by the source, and not absorbed by the analyzed gas. The reference light wave may be measured by a reference photodetector. Document EP2133684, for example, describes a configuration in which a measurement photodetector and a reference photodetector are placed symmetrically with respect to a light source.

Comparison between the light wave in the presence of the gas and the light wave without gas allows the gas to be characterized. It is, for example, a question of determining an amount of a gaseous species in the gas, using the technology referred to as "NDIR absorption." It may also be a question of estimating the number of particles in the gas, by detecting light scattered by the latter in a preset angular range of scatter.

The reference light wave is measured by a reference photodetector. It may be a question of a reference photodetector different from the measurement photodetector, and arranged so as to be placed facing the light source, the reference photodetector being associated with a reference optical filter. The reference optical filter defines a reference spectral band, in which the gas to be analyzed has no significant absorption.

Documents EP2711687 and EP2891876 describe gas sensors comprising chambers, in which one or more mirrors are arranged. The mirrors allow the path length of the light in the chamber to be maximized, and light rays having passed through the gas to be focused onto the one or more photodetectors. This allows the detection sensitivity to be increased while using compact devices. Use of parabolic mirrors is described in WO2006/135212.

Document WO2012/126471 describes a gas sensor composed of various elementary sensors that are juxtaposed with one another. In this device, the analyzed gas flows through the various elementary sensors.

The objective of the disclosure is to provide a gas sensor of optimized performance, notably privileging compactness and sensitivity.

BRIEF SUMMARY

A first subject of the disclosure is gas sensor comprising a chamber, able to receive the gas, the sensor also comprising:
 a light source, able to emit a light wave that propagates through the chamber in an emission cone; and
 a measurement photodetector and a reference photodetector, each being able to detect a light wave emitted by the light source and having passed through the chamber;
 the sensor being such that the chamber lies between two transverse walls, which are placed facing each other, the transverse walls being connected to each other by a peripheral, and notably cylindrical, wall that extends, between the transverse walls, about a longitudinal axis, the peripheral wall comprising:
 a first reflective segment, able to receive a first portion of the emission cone in order to reflect it toward the measurement photodetector, thus forming a cone called the measurement cone, which converges toward the measurement photodetector; and
 a second reflective segment, able to receive a second portion of the emission cone in order to reflect it toward the reference photodetector, thus forming a cone called the reference cone, which converges toward the reference photodetector.

According to one embodiment, the chamber comprises at least one aperture, produced in one of the transverse walls, and intended for the admission or evacuation of the gas, the aperture being produced, in the transverse wall, outside a projection, along the longitudinal axis, and onto the transverse wall, of the emission cone and of the measurement cone. The transverse walls are preferably reflective walls.

Preferably, each aperture allowing the evacuation or admission of gas is also located outside a projection, along the longitudinal axis, of the reference cone.

The chamber may comprise two apertures, each aperture being produced in one of the transverse walls and being intended for the admission or the evacuation of the gas, each aperture being located, on the transverse wall, outside projections, along the longitudinal axis, of the emission cone and of the measurement cone, and preferably of the reference cone.

The transverse walls extend transversely to the longitudinal axis, and preferably lie in a transverse plane, perpendicular to the longitudinal axis. They may be parallel to the transverse plane or substantially parallel to the latter. The term substantially means that an angular tolerance is admissible, for example +/−20° or +/−30.

The first reflective segment and the second reflective segment may in particular be curved. They then describe, in the transverse plane, a curve, the curve possibly being a portion of an ellipse or of a parabola. The first reflective segment may follow, in the transverse plane, a first ellipse, the sensor being such that the apex of the emission cone is placed at a first focus of the first ellipse. Preferably, the apex of the measurement cone is placed at a second focus of the first ellipse, different from the first focus. In this arrangement, the first reflective segment conjugates the light source with the measurement photodetector. The second reflective segment may also follow, in the transverse plane, a second ellipse, the sensor being such that the apex of the emission cone is placed at a first focus of the second ellipse, and such that the apex of the reference cone is placed at a second focus of the second ellipse, different from the first focus of the ellipse.

The first ellipse may have a major axis extending in a direction, the emission cone extending about a central emission axis, the central emission axis being inclined with respect to a direction orthogonal to the direction of the major axis, the angle of inclination being between 5° and 20°.

The measurement photodetector defines an optical axis, the optical axis preferably being inclined with respect to a direction orthogonal to the direction of the major axis, the angle of inclination being between 5° and 20°.

The distance, along the longitudinal axis, between the two transverse walls defines a height of the chamber, for example between 100 μm and 1 cm, and preferably between 500 μm and 1 cm.

A second subject of the disclosure is a device for detecting gas, comprising a plurality of sensors according to the first subject of the disclosure, the device being such that a first sensor and a second sensor are superposed on each other, the chamber of a first sensor being placed on the chamber of a second sensor, such that an aperture, produced in a transverse wall of the first sensor is connected to an aperture produced in a transverse wall of the second sensor, so as to allow a flow of the gas between the two sensors, through the apertures. A transverse wall of the first sensor, comprising an aperture is placed facing a transverse wall of the second sensor, comprising an aperture, so as to allow the flow of gas through the apertures produced in the transverse walls.

Other advantages and features will become more clearly apparent from the following description of particular embodiments of the invention, which are given by way of nonlimiting example, and shown in the figures listed below.

DETAILED DESCRIPTION

Figure 1:
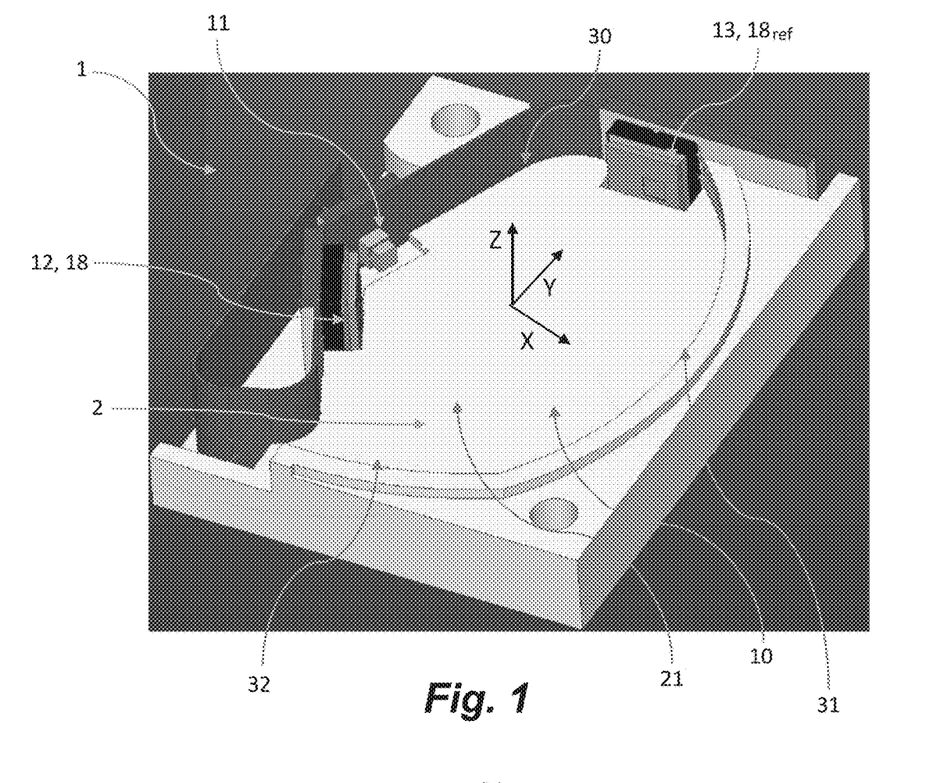
FIG. 1 shows a schematic of the main components of an example of a gas sensor.

FIG. 1 shows an example of a gas sensor according to the disclosure. The sensor comprises a chamber 10, able to receive a gas to be analyzed. The chamber is bounded by two walls 21, 22, called transverse walls, lying in a transverse plane XY. In FIG. 1, a first transverse wall 21 has been shown, the second transverse wall 22 being shown transparent so as to allow the interior of the chamber 10 to be seen. The transverse walls 21 and 22 are shown in FIGS. 2C and 2D.

The transverse walls may be parallel to the transverse plane XY, or substantially parallel to the latter, the term substantially indicating that an angular tolerance, for example +/−20° or +/−30° is admissible. They may be planar or curved.

The chamber also comprises a wall, called a peripheral wall 30, bounding the chamber, and extending between the first transverse wall 21 and the second transverse wall 22. The peripheral wall 30 extends about a longitudinal axis Z, perpendicular to the transverse plane XY. The peripheral wall 30 takes the form of a cylindrical wall, the cross section of which, in the transverse plane XY, comprises curved segments 31, 32 and planar segments, as described with reference to FIGS. 2A and 2B. The curved segments may notably be elliptic or parabolic. An elliptic segment follows, in the transverse plane XY, the outline of one portion of an ellipse. A parabolic segment follows, in the transverse plane XY, the outline of one portion of a parabola.

The gas sensor 1 comprises a light source 11, able to emit a light wave 11' in an emission cone $\Omega 1$, the emission cone extending about an emission axis $\Delta 1$. The light source 11 is placed at the apex S1 of the emission cone $\Omega 1$. The light source 11 is able to emit the light wave 11', called the incident light wave, in an illumination spectral band $\Delta$, the latter possibly lying between the near ultraviolet and the mid infrared, between 200 nm and 10 μm, and most often in the infrared, notably between 1 μm and 10 μm. The light source 11 may notably be pulsed, the incident light wave 11' being a pulse of duration generally between 100 ms and 1 s. It may notably be a question of a suspended filament light source, the filament of which is passed through by an electric current and heated to a temperature between 400° C. and 800° C. so as to emit infrared light.

The peripheral wall 30 comprises a first reflective segment 31, configured to receive a first portion of the emission cone Ω1, so as to reflect it toward a photodetector, called the measurement photodetector 12. In this way, one portion of the light wave 11' located in the emission cone Ω1 is reflected toward the measurement photodetector 12. The light wave thus passes through the gas present in the chamber 10, thus forming a transmitted wave 14 that reaches the measurement photodetector 12 and is detected by the latter. In the example in question, the measurement photodetector 12 is a thermopile, able to deliver a signal dependent on the intensity of the light wave to which the photodetector is exposed. It may also be a question of a photodiode or of another type of photodetector. The measurement photodetector 12 may be coupled to a bandpass filter 18, the spectral band of which corresponds to a spectral band of a gaseous species $G_S$ the amount $C_S$ of which in the gas mixture it is desired to determine. The intensity I of the light wave 14 detected by the measurement photodetector 12 depends on the amount $C_S$ according to the Beer-Lambert law:

$$att = \frac{I}{I_0} = e^{-\mu(C_s)l} \quad (1)$$

in which:
$\mu(C_s)$ is an attenuation coefficient, dependent on the sought-after amount $C_S$;
l is the thickness of gas passed through by the light wave in the chamber;
$I_0$ is the intensity of the incident light wave, which corresponds to the intensity of the wave reaching the measurement photodetector 12 in the absence of absorbent gas in the chamber.

The comparison between I and $I_0$, taking the form of a ratio $$\frac{I}{I_0},$$

corresponds to an attenuation att generated by the gaseous species in question.

During each pulse of the light source 11, it is thus possible to determine $\mu(C_s)$, this allowing $\hat{C}_s$ to be estimated since the relationship between $C_s$ and $\mu(C_s)$ is known.

By reflective wall, what is meant is a wall the reflection coefficient of which, in all or some of the spectral band Δ of the light wave emitted by the light source 11, is higher than 50%, and preferably higher than 80%. A reflective wall may be formed using a reflective material such as a metal, gold for example.

Expression (1) assumes the intensity $I_0$ of the light wave emitted by the light source 11 is well known. To this end, the device comprises a reference photodetector 13, arranged such that it detects a light wave, called the reference light wave $11_{ref}$, reaching the reference photodetector 13 without interacting with the gas present in the chamber 10, or without significantly interacting with the latter. The peripheral wall 30 comprises to this end a second reflective segment 32, configured to receive a second portion of the emission cone Ω1 emitted by the light source 11, so as to reflect it toward the reference photodetector 13. The intensity of the reference light wave $11_{ref}$ detected by the reference photodetector 13, is designated by the term reference intensity $I_{ref}$. In this example, the reference photodetector 13 is associated with an optical filter, called the reference optical filter $18_{ref}$. The reference optical filter $18_{ref}$ defines a passband corresponding to a range of wavelengths not absorbed by the sample. The reference passband is, for example, centered on the wavelength of 3.91 μm. The measurement of $I_f$ allows $I_0$ to be estimated, this allowing $\mu(C_s)$ to be determined, then $\hat{C}_s$ to be estimated. The measurement of $I_{ref}$ notably allows temporal variations in the intensity $I_0$ of the light wave emitted by the light source 11 to be taken into account.

In the example shown in FIG. 1, the light source 11, the measurement photodetector 12 and the reference photodetector 13 lie at least partially inside the chamber 10. As variants, the light source 11, and/or the measurement photodetector 12 and/or the reference photodetector 13 are placed outside the chamber 10. Transparent windows or apertures are then provided in the chamber 10, so as to allow light to be transmitted from one side to the other of the peripheral wall 30.

Figure 2A:
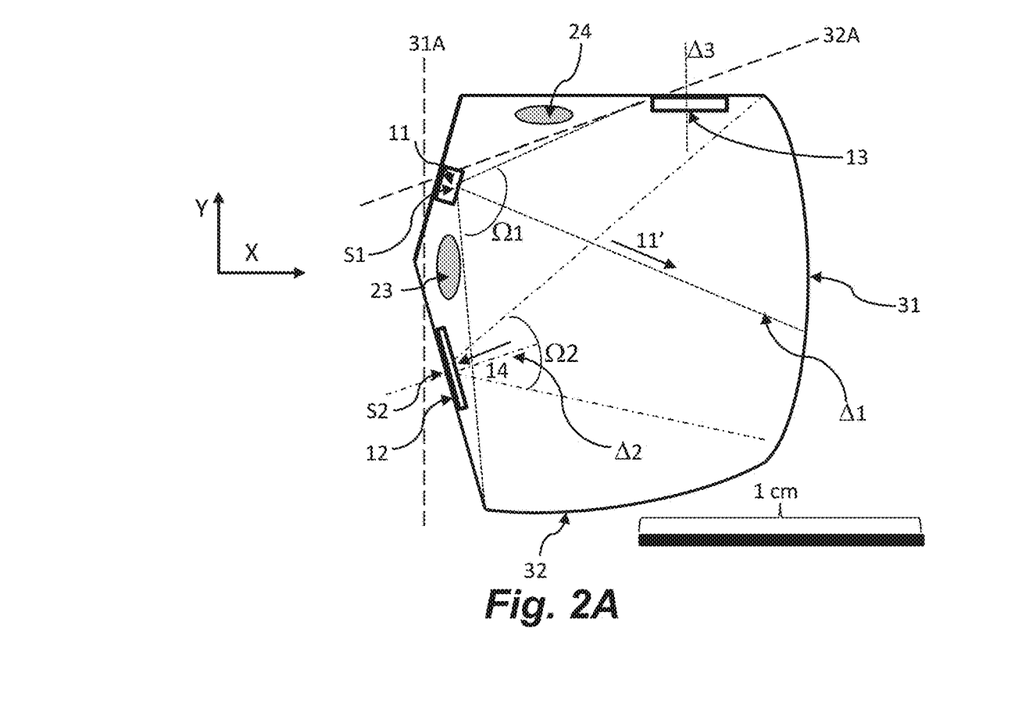
FIGS. 2A and 2B show a cross section describing the geometry of the chamber of the gas sensor shown in FIG. 1, and the arrangement of the main components of the sensor.

FIG. 2A shows a transverse cross section of the gas sensor shown in FIG. 1. The first reflective segment 31 of the peripheral wall 30 receives one portion of the emission cone Ω1 emitted by the light source and reflects it toward the measurement photodetector 12, in a reflection cone Ω2, called the measurement cone. In the transverse plane XY, the first reflective segment 31 follows the outline of a segment of ellipse, called the first ellipse, defining a major axis extending in a direction 31A. The light source 11 is placed at a first focus of the first ellipse, whereas the measurement photodetector 12 is placed at a second focus of the first ellipse. FIG. 2A contains a bar defining a scale.

Figure 2B:
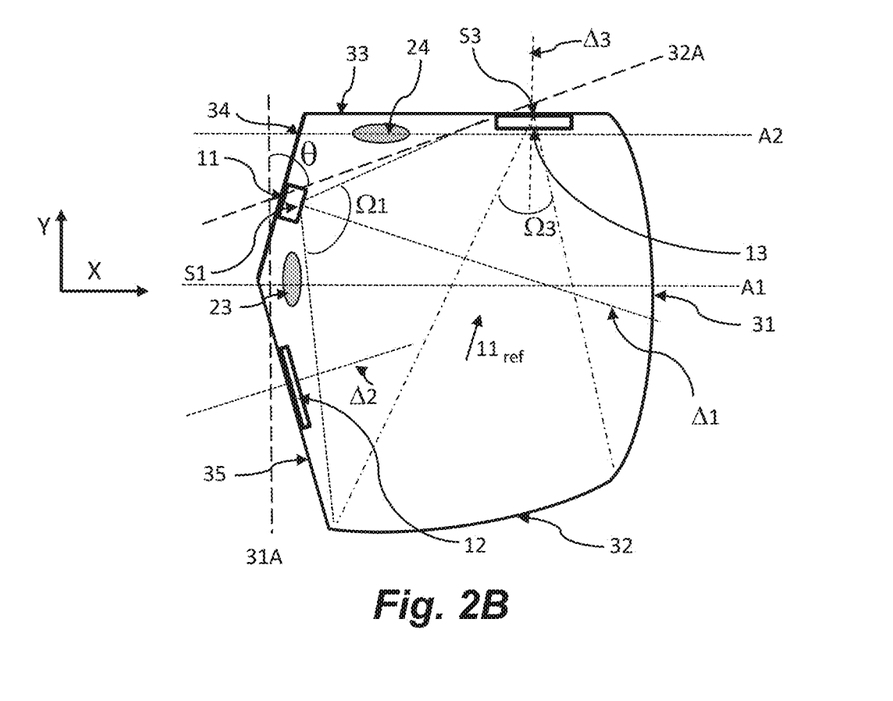
Figure 2C:
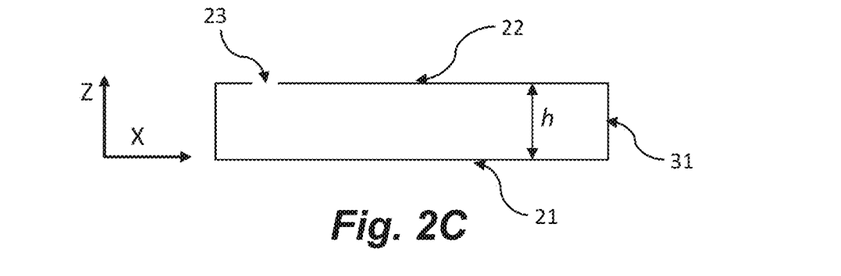
FIG. 2C shows an example of an aperture produced in a transverse wall of the chamber of the sensor.
Figure 2D:
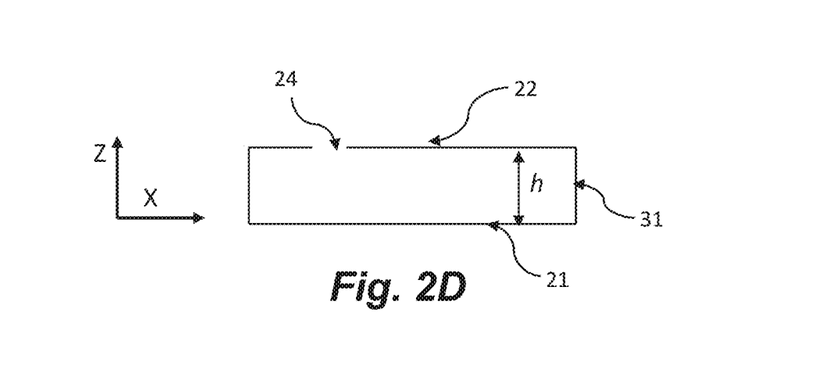
FIG. 2D shows another example of an aperture produced in a transverse wall of the chamber of the sensor.

As indicated above, the peripheral wall 30 comprises a second reflective segment 32, configured to receive a second portion of the emission cone Ω1, so as to reflect it toward the reference photodetector 13, in a reflection cone Ω3, called the reference cone. The reference cone Ω3 is shown in FIG. 2B. In the transverse plane XY, the second reflective segment 32 follows the outline of a segment of ellipse, called the second ellipse, defining a major axis extending in a direction 32A. The light source 11 is placed at a first focus of the second ellipse, whereas the reference photodetector 13 is placed at a second focus of the second ellipse.

Preferably, whatever the embodiment, the curved segments 31 and 32 are arranged to conjugate the light source 11 with the measurement photodetector 12 and with the reference photodetector 13, respectively. Thus, the measurement cone Ω2 and the reference cone Ω3 converge on the measurement photodetector 12 and on the reference photodetector 13, respectively. In such an arrangement, the measurement photodetector 12 is placed at the apex S2 of the measurement cone Ω2, the reference photodetector 13 being placed at the apex S3 of the reference cone Ω3. Such an arrangement allows the amount of light detected by each photodetector to be optimized, and therefore the sensitivity of the sensor to be improved. It will be noted that the segments 31 and 32 may also be parabolic, or form planar facets, all of the facets together describing, in the longitudinal plane XY, a portion of a curve, for example a parabola or an ellipse.

Preferably, the light source 11 is placed such that the distance, in the transverse plane XY, separating it from each point of the first reflective segment 31, is larger than or equal to the distance separating the foci of the first ellipse, this distance usually being noted 2c, c designating the distance between a focus of the ellipse and its center. Likewise, the light source is placed such that the distance, in the transverse plane XY, separating it from each point of the second reflective segment 32 is larger than or equal to the distance separating the foci of the second ellipse. This condition allows the amount of light detected by each photodetector to be improved.

Preferably, the directions of the major axis of the first ellipse and of the major axis of the second ellipse are secant and make an angle θ smaller than or equal to 90°, this angle θ being shown in FIG. 2B. In this example, θ=70°.

In the example shown, the first ellipse and the second ellipse have the geometric characteristics indicated below.

First ellipse (elliptic first segment 31):
length of the major axis: 12.3 mm;
length of the minor axis: 11.9 mm;
distance between the focus of the ellipse and the center of the major axis: 3 mm.

Second ellipse (elliptic second segment 32):
length of the major axis: 12.75 mm;
length of the minor axis: 11.9 mm;
distance between the focus of the ellipse and the center of the major axis: 4.6 mm.

In this example, the peripheral wall 30 extends, along the longitudinal axis Z, over a height h equal to 1.2 mm.

Apart from the elliptic segments 31 and 32, the peripheral wall 30 comprises:
a planar third segment 33, against which the reference photodetector 13 is placed, the optical axis Δ3 of the reference photodetector 13 preferably being orthogonal to the third segment 33;
a planar fourth segment 34, against which the light source 11 is placed, the central axis Δ1 of the emission cone Ω1 preferably being orthogonal to the fourth segment 34; and
a planar fifth segment 35, against which the measurement photodetector 12 is placed, the optical axis Δ2 of the measurement photodetector 12 preferably being orthogonal to the fifth segment 35.

The third segment 33 and/or the fourth segment 34 and/or the fifth segment 35 are preferably reflective. As indicated above, these segments may comprise an aperture or a transparent window when an element such as a photodetector, or the light source 11, is placed outside the chamber 10.

The chamber 10 comprises an admission aperture 23, allowing the admission of the gas into the chamber, and an evacuation aperture 24, allowing the evacuation of the gas from the chamber. The positioning of the apertures. These apertures are produced in one of the transverse walls 21 or 22, as shown in FIGS. 2C and 2D, or in each transverse wall.

The position of the apertures in the transverse walls is not unimportant and it has been estimated that it is preferable to place these apertures such that the respective projections, along the longitudinal axis Z, of the emission cone Ω1 and of the measurement cone Ω2, are located outside each aperture. Thus, each admission aperture 23 or evacuation aperture 24 is produced, in a transverse wall, so as to lie outside the projections, onto the wall, of the emission cone Ω1 and of the measurement cone Ω2. Positioning each aperture in such a way allows the impact of the aperture on the detection carried out by the measurement photodetector 12 to be limited. Preferably, each admission or evacuation aperture is also placed so as to also lie outside of the projection, along the longitudinal axis Z, of the reference cone Ω3. This allows the impact of the aperture on the detection carried out by the reference photodetector 13 to be limited.

FIGS. 2A and 2B show, in gray, portions of the chamber 10 plumb with which admission or evacuation apertures 23, 24 may be produced in the transverse walls 21 or 22. FIG. 2C shows a cross-sectional view of the chamber 10, the transverse walls being spaced apart from each other by a height h, for example, between 100 μm and 1 cm and preferably 500 μm and 1 cm. This cross section is cut in the direction A1 shown in FIG. 2B, and allows the location of the admission aperture 23 produced in the second transverse wall 22 to be seen. FIG. 2D shows another cross-sectional view of the chamber 10, cut in the direction A2 shown in FIG. 2B, and allowing the evacuation aperture 24 produced in the second transverse wall 22 to be observed.

Figure 3:
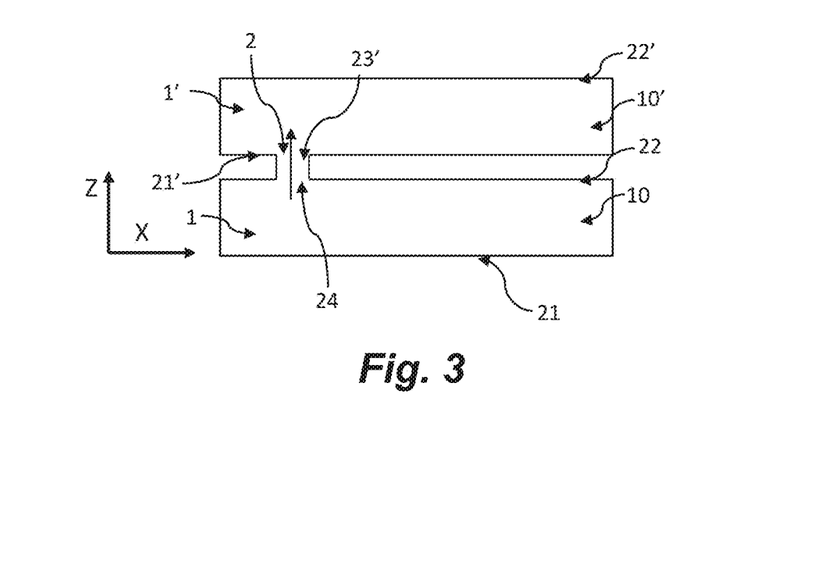
FIG. 3 shows a device obtained by assembling two sensors superposed on each other.

The arrangement of the admission or evacuation apertures in the transverse walls allows the gas sensor 1 to be more easily connected to a fluidic circuit for admitting or evacuating gas. When an admission aperture 23 is produced in the first transverse wall 21 and another evacuation aperture 24 is produced in the second transverse wall 22, it is possible to superpose two chambers on each other, so as to form a detecting device comprising at least two gas sensors 1, 1' such as described above. Such a device is shown in FIG. 3. The detecting device is arranged so that two chambers 10, 10' of each sensor are superposed on each other, a second transverse wall 22 of a first chamber 10 being assembled with a first transverse wall 21' of a second chamber 10', the latter lying between two transverse walls 21', 22'. Thus, the gas 2 to be analyzed may flow from one sensor to another through the apertures produced in each transverse wall. In this figure, the movement of the gas is illustrated by an arrow. Such a configuration allows a plurality of sensors to be placed superposed on each other, each sensor being dedicated to the detection of a preset gaseous species.

Figure 4A:
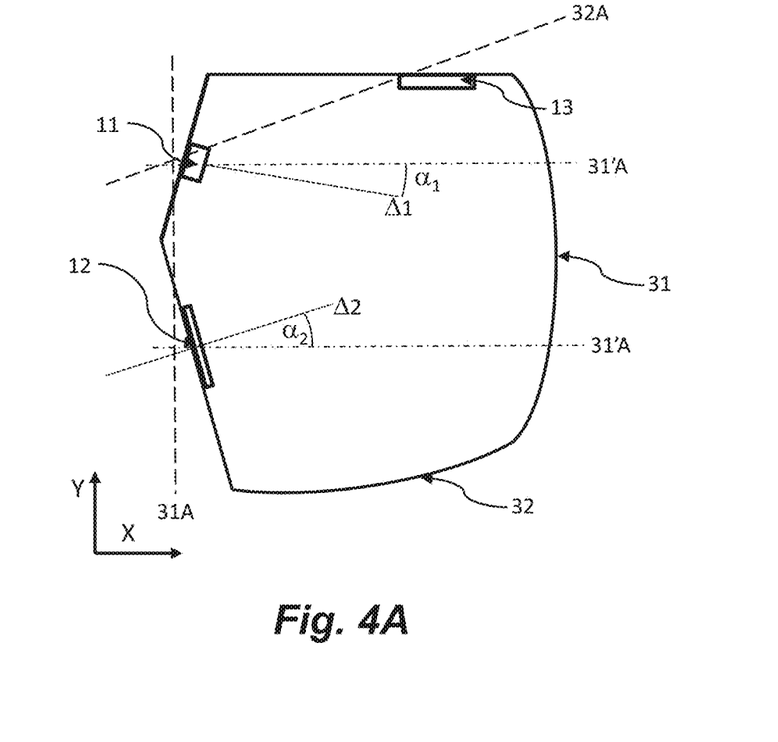
FIG. 4A illustrate two angles of inclination having an influence on the amount of light detected by the measurement photodetector.

Moreover, independently of the position of the admission and evacuation apertures described in the preceding paragraphs, it has been observed that the position of the light source 11, and more precisely the inclination of the central axis Δ1 of the emission cone Ω1, has an influence on the amount of light detected by the measurement photodetector 12. This is also the case for the inclination of the optical axis Δ2 of the measurement photodetector. This effect is illustrated in FIGS. 4A to 4D. FIG. 4A shows an angle of inclination $\alpha_1$, called the first angle of inclination, lying between:
a direction 31'A, orthogonal to the direction 31A of the major axis of the first ellipse, defined by the first reflective segment 31, and
the central axis Δ1 of the emission cone Ω1.

It has been shown, based on simulations, that the angle of inclination $\alpha_1$ thus defined has an influence on the amount of light collected by the measurement photodetector 12, in the arrangement described above. Preferably, this angle is between 5° and 20°, and more preferably between 12° and 18°, i.e., it is about 15°.

FIG. 4A also shows a second angle of inclination as between the direction 31'A defined above and the axis Δ2 of the measurement photodetector 12. Just like the first angle of inclination $\alpha_1$, the second angle of inclination $\alpha_2$ is preferably between 5° and 20°, and more preferably between 10° and 18°, i.e., it is about 15°.

Figure 4B:
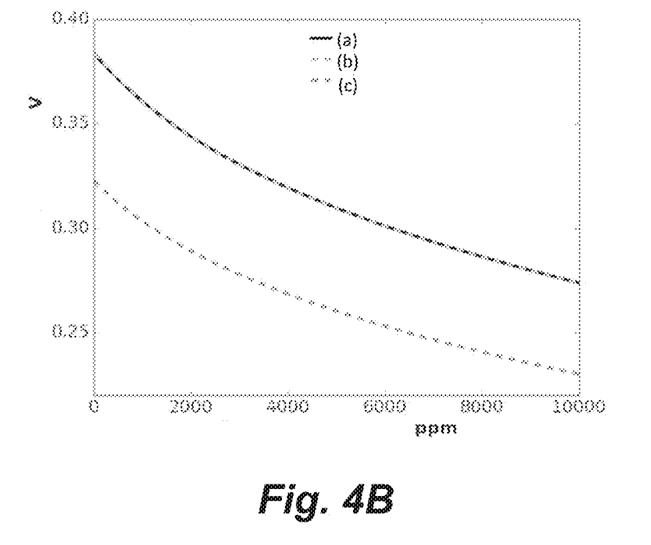
FIG. 4B shows comparative trials, representing the amount of light detected by a photodetector depending on an amount of carbon dioxide measured by the sensor, for various angles of inclination of the emission axis of the light source with respect to a direction normal to the major axis of an ellipse, called the first ellipse, and for various angles of inclination of the axis of the measurement photodetector with respect to the major axis.

Simulations have been carried out so as to compare the amount of light received by the measurement photodetector 12 as a function of three values of the first angle of inclination $\alpha_1$, equal to 10°, 15° and 25°, respectively, and as a function of two values of the second angle of inclination $\alpha_2$, equal to 15° and 25°, respectively. FIG. 4B shows the variation in the amount of light detected by the measurement photodetector 12 as a function of the concentration in ppm of carbon dioxide in the chamber 10. The amount of light detected by the photodetector is expressed in volts, the modeled photodetector being a thermopile. The following are the three tested configurations:
configuration a: $\alpha_1=10°$, $\alpha_2=15°$;
configuration b: $\alpha_1=15°$, $\alpha_2=15°$; and
configuration c: $\alpha_1=25°$, $\alpha_2=25°$.

Angular values of $\alpha_1=10°$, $\alpha_2=15°$ (configuration a) or $\alpha_1=15°$, as =15° (configuration b) allow the amount of light detected to be increased with respect to angles $\alpha_1=25°$, $\alpha_2=25°$ (configuration c). The curves corresponding to configurations a and b are coincident.

Figure 4C:
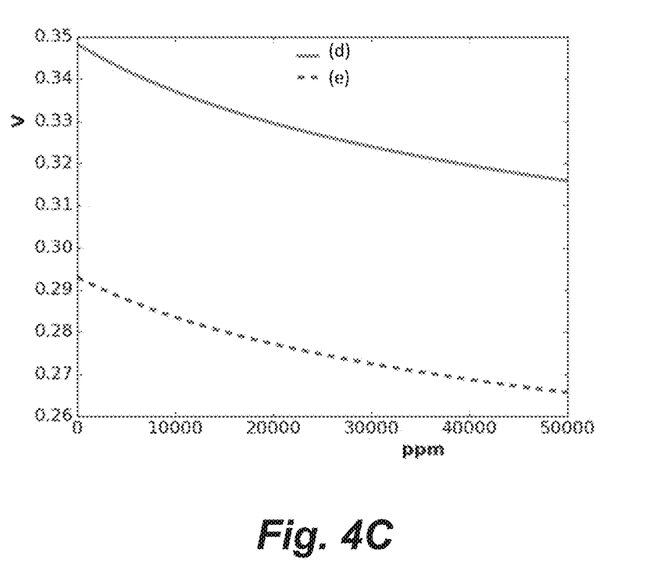
FIG. 4C shows comparative trials, representing the amount of light detected by a photodetector for an amount of methane measured by the sensor, for various angles of inclination of the emission axis of the light source with respect to a direction normal to the major axis of an ellipse, called the first ellipse, and for various angles of inclination of the axis of the measurement photodetector with respect to the major axis.

The same conclusion may be drawn from FIG. 4C, which shows the amount of light detected by the measurement photodetector 12 as a function of the methane concentration in the chamber 10, in two configurations:
configuration d: $\alpha_1=15°$, $\alpha_2=15°$; and
configuration e: $\alpha_1=25°$, $\alpha_2=25°$.

Configuration d is preferable to configuration e.

Figure 4D:
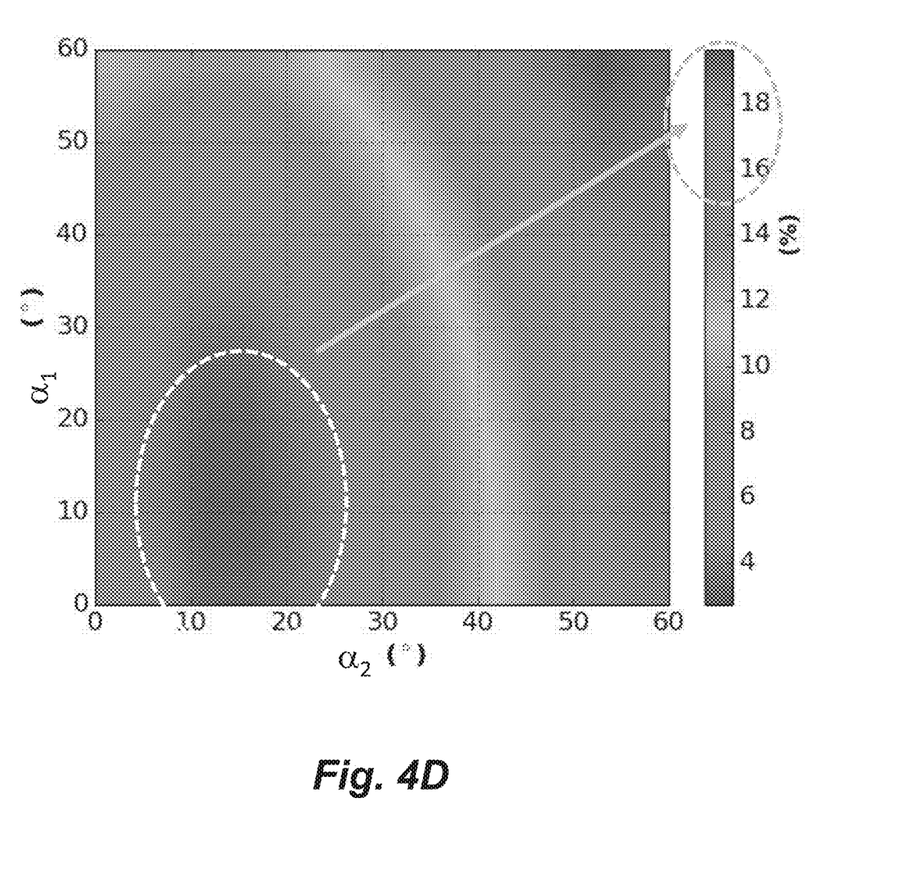
FIG. 4D shows the variation in the amount of signal detected by the measurement photodetector for various angles of inclination of the emission axis of the light source with respect to a direction normal to the major axis of an ellipse, called the first ellipse, and for various angles of inclination of the axis of the measurement photodetector with respect to the major axis.

FIG. 4D shows the percentage of light, emitted by the source, detected by the measurement photodetector 12 in various combinations of $\alpha_1$ (x-axis) and $\alpha_2$ (y-axis). The percentage is represented in grayscale.

The preferred range is encircled by a dashed white line.

The disclosed device(s) will possibly be used for gas sensors in various fields, for example, the environmental field, in particular to monitor atmospheric pollution, in the industrial field, for example, in the chemical industry, the oil-and-gas industry or the food-processing industry, or in the health field.

The invention claimed is:

1. A gas sensor comprising a chamber configured to receive gas, the gas sensor further comprising:
   a light source configured to emit a light wave that propagates through the chamber in an emission cone; and
   a measurement photodetector and a reference photodetector, each being configured to detect a light wave emitted by the light source and having passed through the chamber;
   wherein the chamber lies between two transverse walls that are placed facing each other, the transverse walls being connected to each other by a peripheral wall that extends, between the transverse walls, about a longitudinal axis, the peripheral wall comprising:
      a first reflective segment, configured to receive a first portion of the emission cone in order to reflect it toward the measurement photodetector, thus forming a measurement cone that converges toward the measurement photodetector, the first reflective segment following, in a transverse plane, perpendicular to the longitudinal axis, a first ellipse, an apex of the emission cone being placed at a first focus of the first ellipse; and
      a second reflective segment, configured to receive a second portion of the emission cone in order to reflect it toward the reference photodetector, thus forming a reference cone that converges toward the reference photodetector; and
      the chamber further comprising at least one aperture produced in one of the transverse walls and intended for admission or evacuation of the gas, the at least one aperture being produced in the one of the transverse walls, outside a projection, along the longitudinal axis, and onto the transverse wall of the emission cone and of the measurement cone.

2. The gas sensor of claim 1, wherein the at least one aperture is also located outside a projection along the longitudinal axis and onto the transverse wall of the reference cone.

3. The gas sensor of claim 1, wherein the chamber comprises two apertures, each aperture being produced in one of the transverse walls and being intended for the admission or the evacuation of the gas, each aperture being located on the transverse wall, outside projections, along the longitudinal axis of the emission cone and of the measurement cone.

4. The gas sensor of claim 1, wherein the transverse walls lie in a transverse plane perpendicular to the longitudinal axis.

5. The gas sensor of claim 1, wherein an apexes of the measurement cone is placed at a second focus of the first ellipse.

6. The gas sensor of claim 1, wherein the second reflective segment follows, in the transverse plane a second ellipse, and wherein the apex of the emission cone is placed at a first focus of the second ellipse, and wherein an apex of the reference cone is placed at a second focus of the second ellipse.

7. The gas sensor of claim 1, wherein the first ellipse has a major axis extending in a direction, the emission cone extending about a central emission axis, the central emission axis being inclined with respect to a direction orthogonal to the direction of the major axis, an angle of inclination being between 5° and 20°.

8. The gas sensor of claim 1, wherein the first ellipse has a major axis, the measurement photodetector defining an optical axis, the optical axis being inclined with respect to a direction orthogonal to the direction of the major axis, an angle of inclination being between 5° and 20°.

9. A device for detecting a gas, comprising a first gas sensor as claimed in claim 1, and a second gas sensor as claimed in claim 1, the first gas sensor and the second gas sensor being superposed on each other, such that a transverse wall of the first gas sensor, comprising an aperture, is placed facing a transverse wall of the second gas sensor, comprising an aperture, so as to allow a flow of gas through the apertures produced in the transverse walls.

10. The gas sensor of claim 1, wherein the transverse walls are reflective walls.

11. A gas sensor comprising a chamber, configured to receive gas, the gas sensor further comprising:
   a light source configured to emit a light wave that propagates through the chamber in an emission cone; and
   a measurement photodetector and a reference photodetector, each being configured to detect a light wave emitted by the light source and having passed through the chamber;
   wherein the chamber lies between two transverse walls, which are placed facing each other, the transverse walls being connected to each other by a peripheral wall that extends, between the transverse walls, about a longitudinal axis, the peripheral wall comprising:
      a first reflective segment configured to receive a first portion of the emission cone in order to reflect it toward the measurement photodetector, thus forming a measurement cone, which converges toward the measurement photodetector, the first reflective segment following, in a transverse plane, perpendicular to the longitudinal axis, a first ellipse, an apex of the emission cone being placed at a first focus of the first ellipse; and
      a second reflective segment configured to receive a second portion of the emission cone in order to reflect it toward the reference photodetector, thus forming a reference cone, which converges toward the reference photodetector;

wherein an apex of the measurement cone is placed at a second focus of the first ellipse.

12. The gas sensor of claim 11, wherein the second reflective segment follows, in the transverse plane, a second ellipse, and wherein the apex of the emission cone is placed at a first focus of the second ellipse, and wherein an apex of the reference cone is placed at a second focus of the second ellipse.

13. The gas sensor of claim 11, wherein the first ellipse has a major axis extending in a direction, the emission cone extending about a central emission axis, the central emission axis being inclined with respect to a direction orthogonal to the direction of the major axis, an angle of inclination being between 5° and 20°.

14. The gas sensor of claim 11, wherein the first ellipse has a major axis, the measurement photodetector defining an optical axis, the optical axis being inclined with respect to a direction orthogonal to the direction of the major axis, an angle of inclination being between 5° and 20°.

15. The gas sensor of claim 11, wherein the transverse walls lie in a transverse plane perpendicular to the longitudinal axis.

16. The gas sensor of claim 11, wherein the transverse walls are reflective walls.

* * * * *

UNITED STATES PATENT AND TRADEMARK OFFICE
CERTIFICATE OF CORRECTION

PATENT NO. : 11,022,547 B2  
APPLICATION NO. : 16/492802  
DATED : June 1, 2021  
INVENTOR(S) : Hélène Duprez Page 1 of 1

It is certified that error appears in the above-identified patent and that said Letters Patent is hereby corrected as shown below:

In the Specification  
Column 6, Line 5, change "$I_f$" to --$I_{ref}$--  
Column 8, Line 52, change "as" to --$α_2$--  
Column 9, Line 7, change "as=15°" to --$α_2=15°$--

In the Claims  
Claim 5, Column 10, Line 11, change "apexes" to --apex--  
Claim 6, Column 10, Line 15, change "plane a second" to --plane, a second--

Signed and Sealed this  
Thirteenth Day of July, 2021

Drew Hirshfeld  
*Performing the Functions and Duties of the  
Under Secretary of Commerce for Intellectual Property and  
Director of the United States Patent and Trademark Office*